United States Patent [19]

Gold

[11] Patent Number: 5,613,755
[45] Date of Patent: Mar. 25, 1997

[54] REAR DOOR VAN LIGHTS

[76] Inventor: Peter Gold, 465 N. Wood Rd., Rockville Centre, N.Y. 11570

[21] Appl. No.: 672,984

[22] Filed: Jul. 1, 1996

[51] Int. Cl.⁶ .................. B60Q 1/26; B60Q 1/48
[52] U.S. Cl. .................. 362/80; 362/83.3; 362/249; 340/472
[58] Field of Search .................. 362/80, 83.3, 249, 362/252, 61, 253, 234; 340/469, 472, 473, 470

[56] References Cited

U.S. PATENT DOCUMENTS

| | | | |
|---|---|---|---|
| 2,853,595 | 9/1958 | Baldwin | 362/80 |
| 2,991,116 | 7/1961 | Andrews | 362/80 |
| 3,175,186 | 3/1965 | Barenyi | 362/80 |
| 3,191,019 | 6/1965 | Rijnders et al. | 362/225 |
| 5,193,895 | 3/1993 | Naruke et al. | 362/80 |
| 5,523,926 | 6/1996 | Gold | 362/80 |

*Primary Examiner*—Ira S. Lazarus
*Assistant Examiner*—Thomas M. Sember
*Attorney, Agent, or Firm*—Myron Amer PC

[57] ABSTRACT

A cyclops light as now mandated by law on the panel above the rear doors of a van is relocated as side-by-side lights to the inside adjacent corners of the doors. Each light is provided with a side lens so that when a door is open, as when loading and unloading the van, the light is seen through the side lens as a safety signal to a motorist approaching from the rear. The light seen through the previously used rear lens is still in use, but as a safety signal to a motorist approaching from the front in a passing lane.

1 Claim, 1 Drawing Sheet

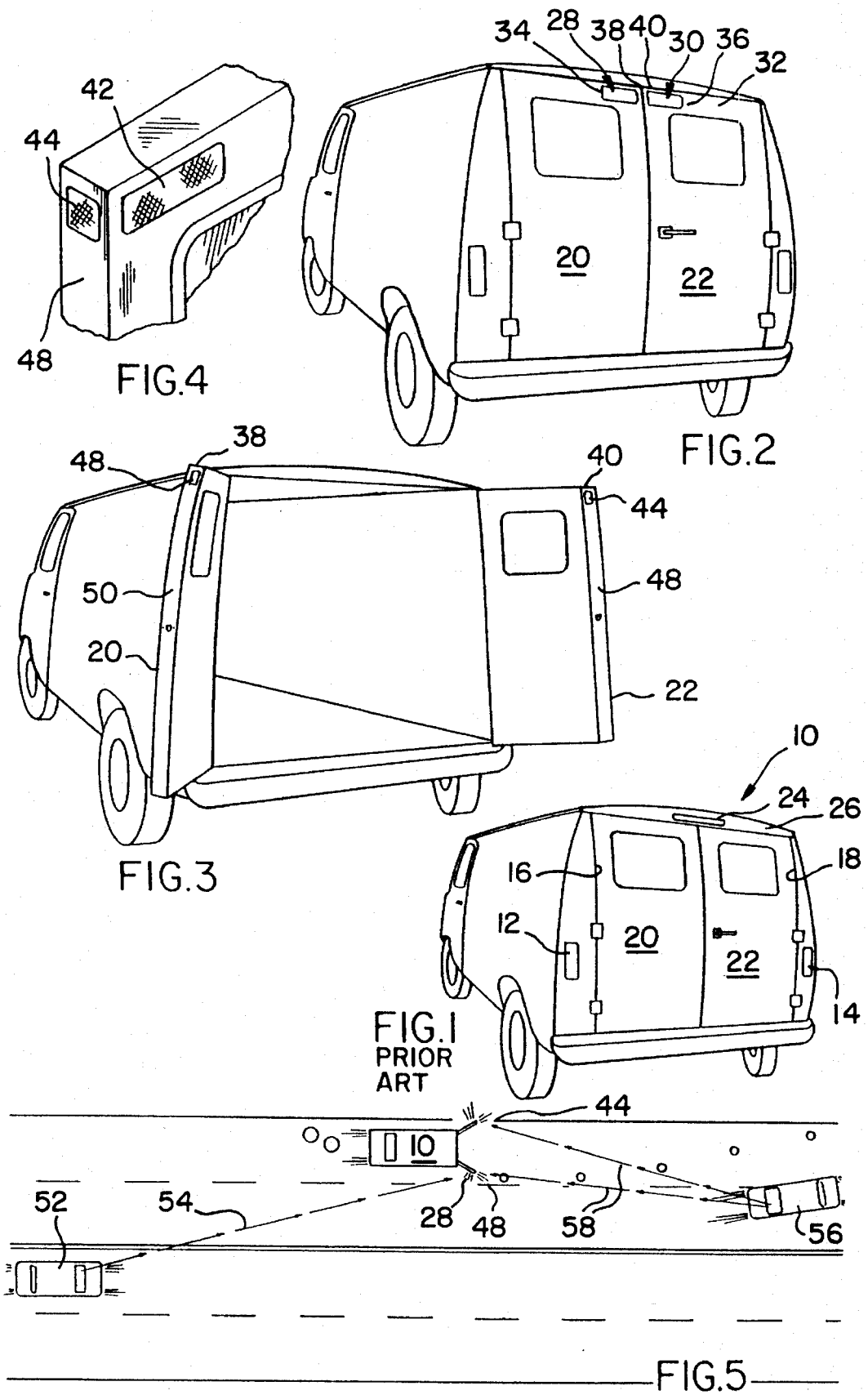

5,613,755

REAR DOOR VAN LIGHTS

The present invention relates generally to improvements in the rear light display of an industrial van, the improvements more particularly supplementing the display to approaching motorists when the doors are open, as when the van is being loaded and unloaded, and the open doors obscure from view the van tail lights and contribute to a hazardous traffic situation.

EXAMPLE OF THE PRIOR ART

The need to supplement obscured tail lights is addressed in numerous prior patents, as exemplified by U.S. Pat. No. 5,523,926 for Industrial Van issued to Peter Gold on Jun. 4, 1996. Although what is provided in the '926 patent is noteworthy, namely additional lights on the edges of the open doors and thus visible to an approaching motorist, the light display can be additionally enhanced, particularly since it is now required by law that the van in addition to tail lights have an elevated, centrally located so-called cyclops light. As now embodied on the van, the cyclops light has unnecessary limited utility.

Broadly, it is an object of the present invention to provide additional utility to a tail light/cyclops light combination embodiment on an industrial van overcoming the foregoing and other shortcomings of the prior art.

More particularly, it is an object to make the presence of a light display known to motorists not only approaching the van from the rear but also passing from the front and along side the van, resulting from nominal construction and position changes in the cyclops light, all as will be better understood as the description proceeds.

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of the rear of an industrial van having tail lights supplemented by a so-called cyclops light in a known location;

FIG. 2 is a perspective view similar to FIG. 1 but illustrating a within inventive modification of the cyclops light and a strategic location thereof in accordance with the present invention;

FIG. 3 is another similar perspective view, but illustrating the rear doors of the industrial van in an open condition;

FIG. 4 is an isolated partial perspective view of the upper left corner of the right door, it being understood that the illustrated structure duplicates that of upper right corner of the left door; and FIG. 5 is a plan view illustrating the utility of the within inventive light display of FIGS. 2–4.

Designated prior art in FIG. 1 is a well known industrial van 10 having rear tail lights 12 and 14 outboard of a hinge axis 16 and 18 of respective left and right rear doors 20 and 22, and a tail light display supplemented by a so-called cyclops light 24 located centrally above the doors 20, 22 on body panel 26.

The construction of the tail lights 12, 14 and the cyclops light 24 are well known, as are their operating mode of providing a van battery-operated illuminated display to an approaching motorist, being well documented in the patent literature as exemplified by U.S. Pat. No. 5,523,926 for Industrial Van issued to Peter Gold on Jun. 4, 1996, the contents of which by this reference is incorporated herein in its entirety.

Underlying the present invention is the recognition that a significantly enhanced rear light display is obtained, as best understood by comparison of FIG. 1 with FIG. 2, by replacing the cyclops light 24 with additional battery-operated cooperating two door-supported light means 28 and 30 having as illustrated in FIG. 2 an operative position not on the body panel 26 but strategically located as a light-displaying pair in a cooperating relation with each other in side-by-side position centrally of a top edge 32 of the doors 20 and 22, as at the locations 34 and 36. As such, light means 28 is at a centrally located, or inboard, corner 38 of the left door 20, and the other light means 30 is at a centrally located, or inboard, corner 40 of the right door 22. In a closed condition of one or both doors 20, 22, the light means 28, 30 are positioned to present to an oncoming motorist a light display supplementing the light display of the tail lights 12, 14.

Referring to FIG. 4 it will be more readily understood that the known battery-operated bulb of light means 30 transmits light not only through a rear lens 42, but also is operatively effective in a known and well understood manner to transmit light through a side lens 44, the lenses 42 and 44 cooperating to bound the bulb compartment of the light means 30. The construction and operating mode of light means 30 as just described being understood to also be applicable to the light means 28.

The strategic location of the side lens 44, 46 on the respective edges 48 and 50 of the doors 22, 20 are effective also in an open condition of one or both doors 20, 22 to an extent which obscures from view a tail light 12, 14, to present a light display to an oncoming motorist wherein, as illustrated in FIG. 5, motorist 52 coming from a direction passing van 10 has a line of sight 54 to light means 28, and motorist 56 coming from a direction approaching van 10 has lines of sight 58 to the illuminated side lenses 44 and 46.

In rare circumstances when a special hinge is used to hingedly mount the doors 20 and 22 so that a 180 degree opening pivotal traverse is possible, to provide in such circumstances a light display to an approaching motorist the light means 28 and 30 can be readily embodied also with another pair of lenses (not shown) positioned directly behind the rear lenses 42 and 44. Thus, use of the modified cyclops light 24 according to the present invention even with doors that swing open 180 degrees is without adverse effect on the safe use of the van 10.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. Improvements for providing a safe environment for loading and unloading out of a rear of a van of a type having a body with right and left pivotally hinged doors and tail lights displayed to an oncoming motorist located outwardly of a hinge axis of said right and left doors illuminated by a battery of said van, wherein said tail lights are obscured to said oncoming motorist when said right and left doors are in an open condition, said improvements comprising an additional battery-operated cooperating two door-supported light means having an operative position strategically located as a pair in said cooperating relation with each other in side-by-side position centrally of a top edge of said left and right doors, wherein one of said light means is at a centrally located corner of said left door and the other of said light means is at a centrally located corner of said right door such that in a closed condition of said left and right doors said strategic locations of said light means present to an oncoming motorist a light display supplementing the light display of said tail lights, and each said light means having lens means on an edge of said supporting door operatively effective for a transmission of light therethrough, whereby also in an open condition of a door to an extent which obscures from view a tail light there is a light display presented to an oncoming motorist.

* * * * *